US012608037B2

(12) United States Patent
Rodrigue et al.

(10) Patent No.: US 12,608,037 B2
(45) Date of Patent: Apr. 21, 2026

(54) SYSTEM, METHOD, AND DEVICE FOR IMPLEMENTING A TEMPORARY SYSTEM ADJUSTMENT FOR COMPONENT OVERCLOCKING

(71) Applicants: Advanced Micro Devices, Inc, Santa Clara, CA (US); ATI TECHNOLOGIES ULC, Markham (CA)

(72) Inventors: Wayne Paul Rodrigue, Buda, TX (US); Grant Evan Ley, Eden, UT (US); Jerry Anton Ahrens, Jr., Sister Bay, WI (US); Coralie So, Toronto (CA); Xianglong Du, Shanghai (CN); Nicholas Carmine DeFiore, Austin, TX (US); Ronald James Baughman, Austin, TX (US); Joshua Taylor Knight, Georgetown, TX (US); William Robert Alverson, Del Valle, TX (US)

(73) Assignees: Advanced Micro Devices, Inc, Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/399,052

(22) Filed: Dec. 28, 2023

(65) Prior Publication Data

US 2025/0216888 A1 Jul. 3, 2025

(51) Int. Cl.
*G06F 1/08* (2006.01)
(52) U.S. Cl.
CPC ...................................... *G06F 1/08* (2013.01)

(58) Field of Classification Search
CPC ..... G06F 1/08; G06F 1/10; G06F 1/12; G06F 1/14
See application file for complete search history.

(56) References Cited

U.S. PATENT DOCUMENTS 6,051,888 A    4/2000  Dahl
6,219,241 B1   4/2001  Jones
(Continued)

FOREIGN PATENT DOCUMENTS

CN        2665787 Y     12/2004
CN      208673319 U      3/2019
(Continued)

OTHER PUBLICATIONS

U.S. Appl. No. 17/708,453, , "Final Office Action", U.S. Appl. No. 17/708,453, Jul. 20, 2023, 12 pages.
(Continued)

*Primary Examiner* — Raymond N Phan
(74) *Attorney, Agent, or Firm* — FIG. 1 Patents

(57) ABSTRACT

Temporary system adjustment for component overclocking is described. In accordance with the described techniques, a processor and/or memory are operated according to first settings. During operation of the processor and/or the memory according to the first settings, a signal triggers a temporary adjustment of operation of the processor and/or the memory according to second settings. Responsive to the request, operation of the processor and/or the memory is switched to the second settings without rebooting. After a duration, operation of the processor and/or the memory is switched back to the first settings. In one or more implementations, at least one of the first settings or the second settings overclock the processor and/or the memory.

20 Claims, 4 Drawing Sheets

(56) References Cited

U.S. PATENT DOCUMENTS

| | | | |
|---|---|---|---|
| 7,382,366 | B1 | 6/2008 | Klock et al. |
| 7,469,355 | B1* | 12/2008 | Chong ............... G06F 1/206 |
| | | | 713/600 |
| 7,500,122 | B2* | 3/2009 | Won ............... G06F 1/206 |
| | | | 713/320 |
| 8,407,506 | B2 | 3/2013 | Joshi et al. |
| 8,909,383 | B2 | 12/2014 | Hadderman et al. |
| 9,360,909 | B2 | 6/2016 | Wells et al. |
| 10,466,737 | B2 | 11/2019 | Han |
| 10,904,086 | B1 | 1/2021 | Varia et al. |
| 11,262,924 | B2 | 3/2022 | Alverson et al. |
| 11,373,929 | B1 | 6/2022 | Refai-ahmed et al. |
| 11,609,596 | B2* | 3/2023 | Sin ............... G06F 1/3228 |
| 11,835,998 | B2 | 12/2023 | Mehra et al. |
| 11,977,757 | B2 | 5/2024 | Ley et al. |
| 12,038,779 | B2* | 7/2024 | Mehra ............... G06F 1/3296 |
| 12,399,621 | B2 | 8/2025 | Joshi et al. |
| 12,429,932 | B2 | 9/2025 | Ahrens et al. |
| 2002/0161609 | A1 | 10/2002 | Zizzamia et al. |
| 2003/0065915 | A1* | 4/2003 | Yu ............... G06F 11/1417 |
| | | | 713/1 |
| 2003/0097602 | A1 | 5/2003 | Bigbee et al. |
| 2003/0202512 | A1 | 10/2003 | Kennedy |
| 2004/0190259 | A1 | 9/2004 | Labanok et al. |
| 2005/0266711 | A1 | 12/2005 | Petersen et al. |
| 2006/0146638 | A1 | 7/2006 | Chang et al. |
| 2006/0149975 | A1 | 7/2006 | Rotem et al. |
| 2006/0280018 | A1 | 12/2006 | Cases et al. |
| 2007/0035985 | A1 | 2/2007 | Fifield et al. |
| 2007/0044049 | A1 | 2/2007 | Adams et al. |
| 2007/0106428 | A1 | 5/2007 | Omizo et al. |
| 2007/0183179 | A1 | 8/2007 | Maeda et al. |
| 2008/0114973 | A1 | 5/2008 | Norton et al. |
| 2008/0198031 | A1 | 8/2008 | Takiar et al. |
| 2008/0230893 | A1 | 9/2008 | Too et al. |
| 2008/0276026 | A1 | 11/2008 | Branover et al. |
| 2010/0220516 | A1 | 9/2010 | Lee et al. |
| 2011/0040902 | A1 | 2/2011 | Housty |
| 2011/0161706 | A1 | 6/2011 | Huang et al. |
| 2011/0231637 | A1 | 9/2011 | Schuette |
| 2014/0006864 | A1 | 1/2014 | Menon et al. |
| 2014/0095904 | A1 | 4/2014 | Ananthakrishnan et al. |
| 2014/0136823 | A1 | 5/2014 | Ragland et al. |
| 2014/0229666 | A1 | 8/2014 | Schoenborn et al. |
| 2015/0270018 | A1 | 9/2015 | Chinnakkonda et al. |
| 2016/0084919 | A1 | 3/2016 | Gokaraju et al. |
| 2016/0085551 | A1 | 3/2016 | Greathouse et al. |
| 2016/0282919 | A1 | 9/2016 | Wells et al. |
| 2017/0105278 | A1 | 4/2017 | Cooper et al. |
| 2017/0262354 | A1* | 9/2017 | Han ............... G06F 11/3024 |
| 2018/0188769 | A1 | 7/2018 | Chen et al. |
| 2018/0188770 | A1 | 7/2018 | Chen |
| 2019/0079806 | A1 | 3/2019 | Ragland et al. |
| 2020/0019462 | A1 | 1/2020 | Prather et al. |
| 2020/0049157 | A1 | 2/2020 | Richter |
| 2020/0097201 | A1 | 3/2020 | Irshad et al. |
| 2020/0192420 | A1 | 6/2020 | Irshad et al. |
| 2020/0364041 | A1 | 11/2020 | Bulusu et al. |
| 2021/0043531 | A1 | 2/2021 | Sporer |
| 2021/0068302 | A1 | 3/2021 | North et al. |
| 2021/0191450 | A1 | 6/2021 | Mehra et al. |
| 2021/0326232 | A1 | 10/2021 | Partiwala et al. |
| 2022/0113757 | A1 | 4/2022 | Yan et al. |
| 2022/0155982 | A1 | 5/2022 | Alverson et al. |
| 2022/0179706 | A1 | 6/2022 | Khosrowpour et al. |
| 2023/0107735 | A1 | 4/2023 | Wang et al. |
| 2023/0215475 | A1 | 7/2023 | Chien et al. |
| 2023/0315171 | A1 | 10/2023 | Ahrens et al. |
| 2023/0315191 | A1 | 10/2023 | Alverson et al. |
| 2023/0324947 | A1 | 10/2023 | Mehra et al. |
| 2023/0324967 | A1 | 10/2023 | Ahrens et al. |
| 2023/0350591 | A1 | 11/2023 | Ley et al. |
| 2023/0350696 | A1 | 11/2023 | Harwani et al. |
| 2023/0350715 | A1 | 11/2023 | Knight et al. |
| 2023/0409368 | A1 | 12/2023 | Siddiqui |
| 2024/0220108 | A1 | 7/2024 | Joshi et al. |

FOREIGN PATENT DOCUMENTS

| | | |
|---|---|---|
| CN | 120380543 A | 7/2025 |
| EP | 3885906 A1 | 9/2021 |
| EP | 4643339 A0 | 11/2025 |
| WO | 2023211606 A1 | 11/2023 |
| WO | 2024144868 A1 | 7/2024 |

OTHER PUBLICATIONS

U.S. Appl. No. 17/708,453, , "Non-Final Office Action", U.S. Appl. No. 17/708,453, Mar. 14, 2023, 11 pages.
U.S. Appl. No. 17/708,453, , "Non-Final Office Action", U.S. Appl. No. 17/708,453, Sep. 8, 2023, 13 pages.
U.S. Appl. No. 17/732,718, , "Corrected Notice of Allowability", U.S. Appl. No. 17/732,718, Feb. 29, 2024, 2 pages.
U.S. Appl. No. 17/732,718, , "Non-Final Office Action", U.S. Appl. No. 17/732,718, Sep. 14, 2023, 17 pages.
U.S. Appl. No. 17/732,718, , "Notice of Allowance", U.S. Appl. No. 17/732,718, Jan. 4, 2024, 7 pages.
U.S. Appl. No. 17/732,741, , "Non-Final Office Action", U.S. Appl. No. 17/732,741, Jan. 2, 2024, 11 pages.
Cutress, Ian , "Intel Launches Xeon-W CPUs for Workstations: Skylake-SP & ECC for LGA2066", AnandTech [Online][retrieved Oct. 11, 2023]. Retrieved from the Internet <https://www.anandtech.com/show/11775/intel-launches-xeon-w-cpus-for-workstations>, Aug. 29, 2017, 8 pages.
Joshi, Jayesh H. et al., "Pursuant to MPEP § 2001.06(b) the applicant brings the following co-pending application to the Examiner's attention:", U.S. Appl. No. 18/147,963, filed Dec. 29, 2022, 55 pages.
Knight, Joshua T. et al., "Pursuant to MPEP § 2001.06(b) the applicant brings the following co-pending application to the Examiner's attention:", U.S. Appl. No. 17/732,987, filed Apr. 29, 2022, 41 pages.
Leong, Alicia W. et al., "Pursuant to MPEP § 2001.06(b) the applicant brings the following co-pending application to the Examiner's attention:", U.S. Appl. No. 17/974,981, filed Oct. 27, 2022, 41 pages.
Leong, Alicia W. et al., "Pursuant to MPEP § 2001.06(b) the applicant brings the following co-pending application to the Examiner's attention:", U.S. Appl. No. 18/146,538, filed Dec. 27, 2022, 46 pages.
PCT/US2023/014176, , "International Search Report and Written Opinion", PCT Application No. PCT/US2023/014176, Jun. 12, 2023, 8 pages.
PCT/US2023/016453, , "International Search Report and Written Opinion", PCT Application No. PCT/US2023/016453, Jul. 12, 2023, 11 pages.
PCT/US2023/036338, , "International Seach Report and Written Opinion", PCT Application No. PCT/US2023/036338, Feb. 20, 2024, 7 pages.
PCT/US2023/062509, , "International Search Report and Written Opinion", PCT Application No. PCT/US2023/062509, May 26, 2023, 10 pages.
PCT/US2023/063347, , "International Search Report and Written Opinion", PCT Application No. PCT/US2023/063347, Jun. 13, 2023, 8 pages.
"Non-Final Office Action", U.S. Appl. No. 17/704,862, Feb. 21, 2025, 8 pages.
"Final Office Action", U.S. Appl. No. 17/732,741, Mar. 3, 2025, 12 pages.
"Notice of Allowance", U.S. Appl. No. 18/147,963, Apr. 25, 2025, 7 pages.
U.S. Appl. No. 17/732,718 , "Corrected Notice of Allowability", U.S. Appl. No. 17/732,718, Apr. 10, 2024, 2 pages.
U.S. Appl. No. 18/147,963 , "Non-Final Office Action", U.S. Appl. No. 18/147,963, Jun. 28, 2024, 13 pages.

(56)        References Cited

OTHER PUBLICATIONS

U.S. Appl. No. 17/732,741 , "Final Office Action", U.S. Appl. No. 17/732,741, Jul. 22, 2024, 13 pages.
U.S. Appl. No. 17/704,862 , "Restriction Requirement", U.S. Appl. No. 17/704,862, Oct. 24, 2024, 5 pages.
U.S. Appl. No. 17/732,741 , "Non-Final Office Action", U.S. Appl. No. 17/732,741, Nov. 12, 2024, 16 pages.
U.S. Appl. No. 18/147,963 , "Final Office Action", U.S. Appl. No. 18/147,963, Nov. 12, 2024, 14 pages.
23775445.2 , "Foreign Office Action", EP Application No. 23775445. 2, Nov. 4, 2024, 3 pages.
"Corrected Notice of Allowability", U.S. Appl. No. 17/704,862, Sep. 5, 2025, 2 pages.
"Notice of Allowance", U.S. Appl. No. 17/704,862, Jun. 26, 2025, 5 pages.
"Supplemental Notice of Allowability", U.S. Appl. No. 18/147,963, Jun. 17, 2025, 3 pages.
"Supplemental Notice of Allowability", U.S. Appl. No. 18/147,963, Aug. 4, 2025, 3 pages.
EP Search Report Application No. 23775445.2, mailed Mar. 4, 2026, 6 pages.
Extended European Search Report for Application No. 23775781.0, mailed Feb. 18, 2026, 13 pages.
Extended European Search Report for Application No. 23781949.5 mailed Feb. 24, 2026, 10 pages.
Foreign Office Action issued in IN 202417057364, mailed Dec. 9, 2025, 8 pages.

* cited by examiner

Figure 3:
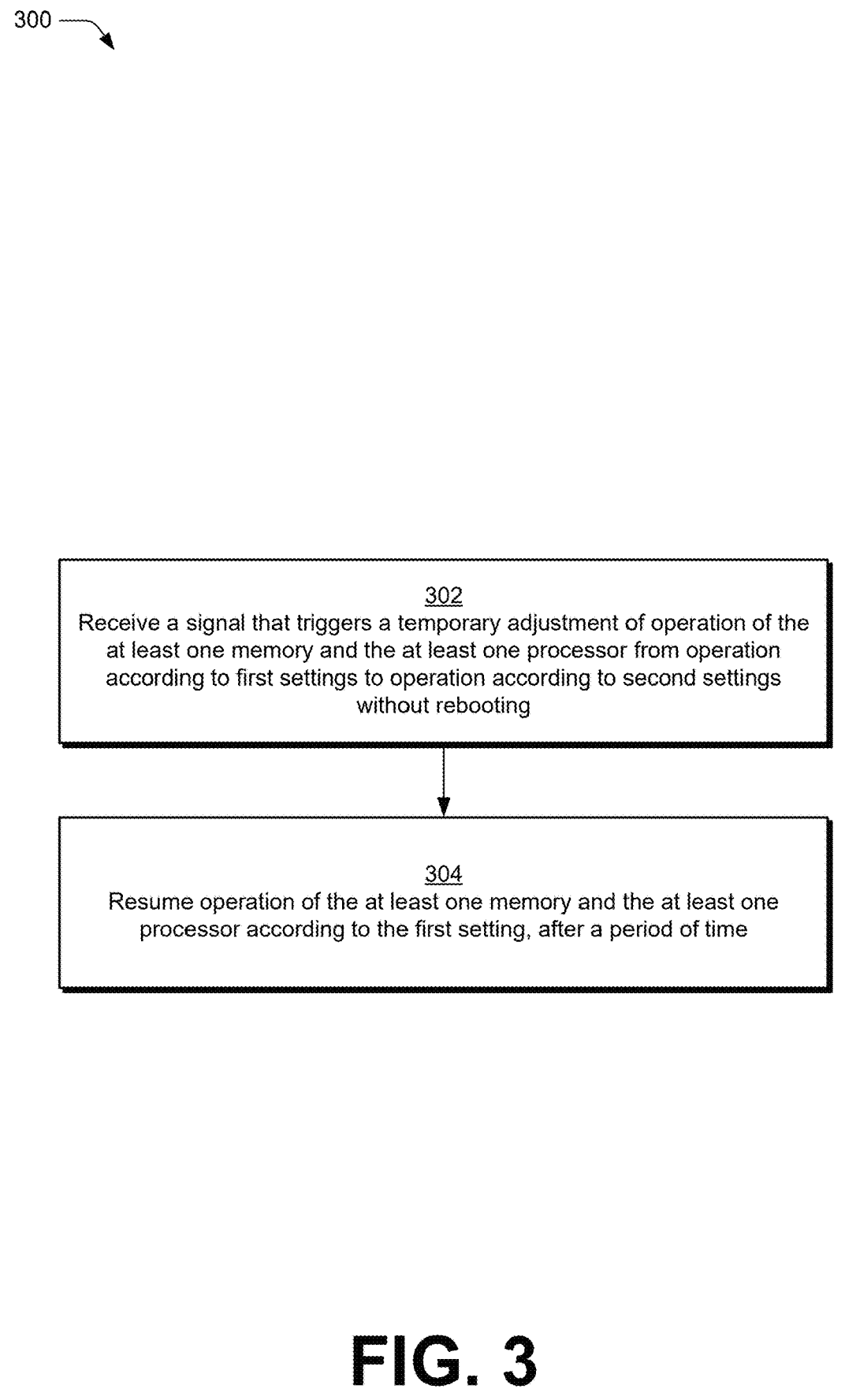

300

```
┌────────────────────────────────────────────────────────┐
│                          302                             │
│ Receive a signal that triggers a temporary adjustment of │
│ operation of the at least one memory and the at least    │
│ one processor from operation according to first settings │
│ to operation according to second settings                │
│ without rebooting                                        │
└────────────────────────────────────────────────────────┘
                            │
                            ▼
┌────────────────────────────────────────────────────────┐
│                          304                             │
│ Resume operation of the at least one memory and the at   │
│ least one processor according to the first setting,      │
│ after a period of time                                   │
└────────────────────────────────────────────────────────┘
```

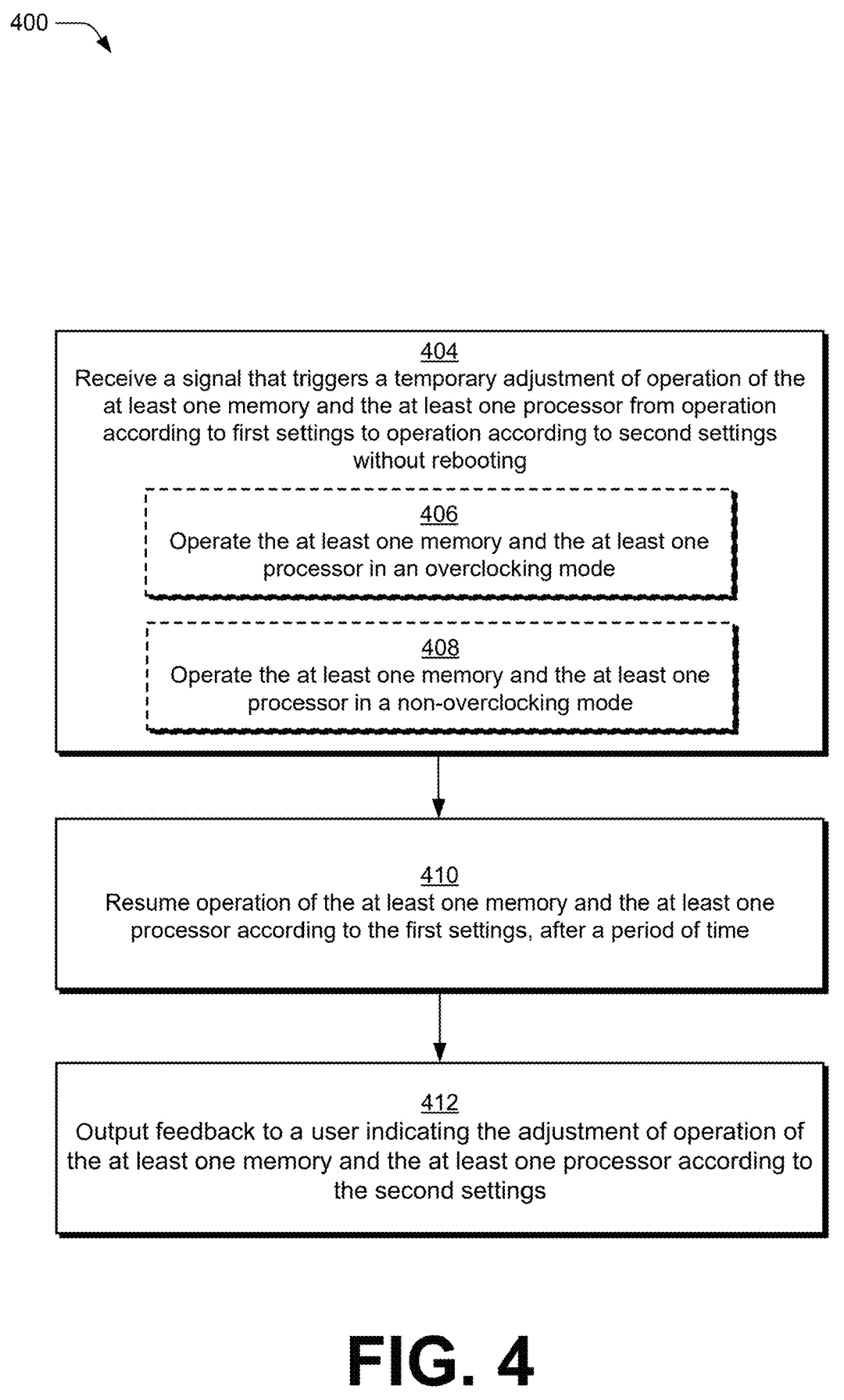

404
Receive a signal that triggers a temporary adjustment of operation of the at least one memory and the at least one processor from operation according to first settings to operation according to second settings without rebooting

406
Operate the at least one memory and the at least one processor in an overclocking mode

408
Operate the at least one memory and the at least one processor in a non-overclocking mode

410
Resume operation of the at least one memory and the at least one processor according to the first settings, after a period of time

412
Output feedback to a user indicating the adjustment of operation of the at least one memory and the at least one processor according to the second settings

FIG. 4

SYSTEM, METHOD, AND DEVICE FOR IMPLEMENTING A TEMPORARY SYSTEM ADJUSTMENT FOR COMPONENT OVERCLOCKING

BACKGROUND

Various components of a computing device are operated according to settings, some of which are adjustable to values that exceed thresholds of operation certified by a manufacturer. Adjusting such settings so that components exceed their certified thresholds is referred to as overclocking. By way of example, components are overclocked when a clock speed, or operating frequency, of a computer component are operated beyond default settings specified by a manufacturer, allowing the component to perform tasks more quickly and efficiently.

BRIEF DESCRIPTION OF THE DRAWINGS

FIG. 3 depicts a procedure in an example implementation of temporary system adjustment for component overclocking.

FIG. 4 depicts a procedure in an example implementation of temporary system adjustment for component overclocking.

DETAILED DESCRIPTION

Overview

Figure 1:
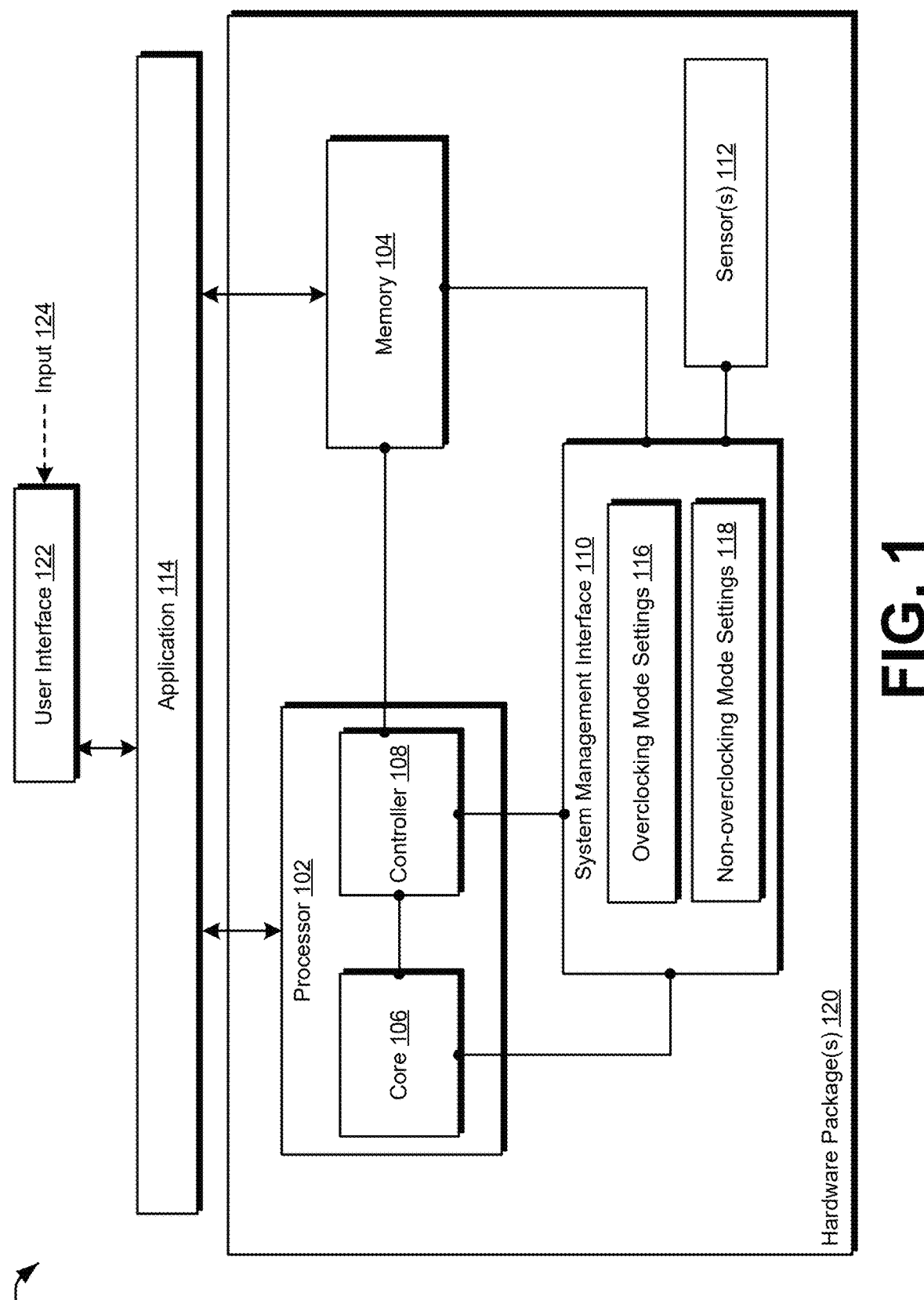
FIG. 1 is a block diagram of a non-limiting example system having a processor, a memory, and a system management interface operable to implement temporary system adjustment for component overclocking.

Conventional systems for overclocking various components of a computing device require a reboot of the system to retrain the components to operate according to modified settings and timing parameters of an overclocking mode. In variations, the components include one or more of a memory component, one or more hardware components implemented by a data fabric, and a processor component, among others. Additionally or alternatively, the settings and timing parameters of the overclocking mode are required to be manually input by a user, which is time consuming for the user and often results in reduced performance of the components. For example, in many cases, the timings and settings of the components are modified too aggressively by a user, which results in a failure during the reboot. In some other examples, the user does not dynamically update the timing and settings of the components, such that each of the components maintains the same system settings during periods that require high performance from the components and during periods that require relatively reduced performance from the components, resulting in inefficient power consumption for the system and/or reduced performance.

To solve these problems, temporary system adjustment for component overclocking is described. Unlike conventional systems, the described techniques enable individual components to transition between operating according to a standard, or less aggressive, operating mode and one or more aggressive overclocking modes temporarily and "on the fly" (e.g., in real time) without requiring a reboot of the system. To enable temporary adjustment of an operating mode, a system management interface receives a signal that triggers a transition of system settings for a component into, or out of, an overclocking mode while one or more conditions are met.

In one or more variations, a processor monitors sensor data, system information, and/or user input to detect one or more of a current performance condition of the system, a current power condition of the system, an anticipated performance condition of the system, or an anticipated power condition of the system, to name just a few. In such variations, the processor initiates transmission of the signal to trigger temporary adjustment of system settings into and out of an overclocking mode. In accordance with the described techniques, operation in the transitioned to mode is temporary, such that the components remain in an overclocking mode and/or a non-overclocking mode for a period of time (e.g., a fixed duration or a dynamic duration based on the monitored sensor data) before automatically transitioning to a different mode (e.g., transitioning back to the previous mode of operation). For example, the components remain in an overclocking mode and/or a non-overclocking mode until the sensor data, the system information, and/or the user inputs change sufficiently to trigger a switch out of the temporary operating mode.

In variations, a system management interface adjusts one or more power and/or performance settings of one or more components of the system independent of one another. For example, the system management interface independently updates operational settings of a memory component, a processor component, and/or one or more hardware components of a data fabric. In various scenarios, the settings are adjusted from a non-overclocking operation mode to an overclocking operation mode or are adjusted from an overclocking operation mode to a non-overclocking operation mode, such as based on current and/or anticipated performance conditions of the components. For example, if the system receives information that indicates a user is engaged in an activity (e.g., gaming) that benefits from increased performance of a component of the system (e.g., central processing unit and/or graphics processing unit), the system management interface adjusts one or more operational settings of the component to operate in an overclocking operation mode. Further, if the system subsequently receives information that indicates the user is no longer engaged in the activity that benefits from increased performance of the component, the system management interface automatically adjusts the operational settings of the component to operate in a non-overclocking, or default, operation mode. Thus, in this example, the operation in the overclocking mode is temporary and, after the temporary period of time, the system automatically adjusts out of the overclocking mode (e.g., without explicit user input to adjust the mode) and into (or back into) a non-overclocking, or default, operation mode.

In some aspects, the techniques described herein relate to a system including at least one memory, and at least one processor configured to receive a signal that triggers temporary adjustment of operation of the at least one memory and the at least one processor from operation according to first settings to operation according to second settings without rebooting, and resume operation of the at least one memory and the at least one processor according to the first settings, after a period of time.

In some aspects, the techniques described herein relate to a system, wherein at least one of the first settings or the second settings configure the at least one memory or the at least one processor to operate in an overclocking mode.

In some aspects, the techniques described herein relate to a system, wherein the signal that triggers the temporary adjustment of operation is based on input.

In some aspects, the techniques described herein relate to a system, further including one or more sensors configured to collect information with an application that utilizes at least one of the at least one memory or the at least one processor.

In some aspects, the techniques described herein relate to a system, wherein the one or more sensors include at least one of motion sensors or camera imaging sensors.

In some aspects, the techniques described herein relate to a system, wherein the information includes at least one of eye gaze information, positioning information, or engagement information.

In some aspects, the techniques described herein relate to a system, wherein the at least one processor is further configured to monitor the information, wherein the operation of the at least one memory and the at least one processor according to the first settings is resumed upon detecting a change in the information.

In some aspects, the techniques described herein relate to a system, further including one or more sensors configured to collect information about at least one of an environment in which the system operates, one or more conditions of the at least one memory, or one or more conditions of the at least one processor.

In some aspects, the techniques described herein relate to a system, wherein the at least one processor is further configured to receive system information about at least one of a performance condition of the system or a power consumption of at least one of the at least one memory or the at least one processor.

In some aspects, the techniques described herein relate to a system, wherein the system information includes at least one of application data, system capabilities, or historical system demand trends.

In some aspects, the techniques described herein relate to a system, wherein the at least one processor is further configured to cause output via a user interface of feedback indicating the temporary adjustment of operation of the at least one memory and the at least one processor according to the second settings.

In some aspects, the techniques described herein relate to a system, wherein the at least one processor is further configured to initiate a timer based on receiving the signal, wherein the operation of the at least one memory and the at least one processor according to the first settings is resumed upon expiry of the timer.

In some aspects, the techniques described herein relate to a system, wherein the at least one processor is further configured to monitor for one or more changes in operation of the at least one memory and the at least one processor, wherein the operation of the at least one memory and the at least one processor according to the first settings is resumed upon detecting the one or more changes.

In some aspects, the techniques described herein relate to a system, wherein the first settings and the second settings are used to set one or more of an operating power, an operating voltage, an operating frequency, or a timing.

In some aspects, the techniques described herein relate to a method including receiving a signal that triggers temporary adjustment of operation of at least one memory and at least one processor from operation according to first settings to operation according to second settings without rebooting, and resuming operation of the at least one memory and the at least one processor according to the first settings, after a period of time.

In some aspects, the techniques described herein relate to a method, wherein at least one of the first settings or the second settings configure the at least one memory or the at least one processor to operate in an overclocking mode.

In some aspects, the techniques described herein relate to a method, wherein the signal that triggers the temporary adjustment of operation is based on input.

In some aspects, the techniques described herein relate to a method, further including collecting, via one or more sensors, information with an application that utilizes at least one of the at least one memory or the at least one processor.

In some aspects, the techniques described herein relate to a method, further including receiving system information about at least one of a performance condition or a power consumption of at least one of the at least one memory or the at least one processor.

In some aspects, the techniques described herein relate to a device including at least one memory, and at least one processor configured to receive a signal that triggers temporary adjustment of operation of the at least one memory and the at least one processor from operation according to first settings to operation according to second settings without rebooting, and resume operation of the at least one memory and the at least one processor according to the first settings, after a period of time, and at least one user interface configured to output feedback indicating the temporary adjustment.

FIG. 1 is a block diagram of a non-limiting example system having a processor, a memory, and a system management interface operable to implement temporary system adjustment for component overclocking. In this example, the system 100 includes processor 102 and memory 104. In at least one implementation, the processor 102 includes a core 106 and a controller 108. The system 100 also includes a system management interface 110, which controls overclocking mode settings of one or more components of the system 100. In the illustrated example, the system 100 is further depicted with one or more sensors 112 (e.g., motion sensors, image capturing sensors, etc.), which collect information related to the overclocking mode settings of the one or more components of the system 100. In some variations, the system 100 further includes one or more additional hardware components (e.g., cache, secondary storage, semiconductor intellectual property (IP) core, etc.).

The processor 102, the memory 104, and optionally the additional hardware component(s) are operable to implement one or more applications 114, including, for instance, entertainment applications, investment applications, productivity applications, or any other application that is executed on an electronic device. In variations, each application 114 causes a demand on the system, such as a performance, processing, and/or power demand. An application 114 collects application data, which includes information about a user, information generated by a user, a current state of the application 114 (e.g., metadata indicating one or more processes run by the application 114), application preferences, and cache data that is stored temporarily to improve the performance of the application 114, to name just a few.

In this example, the above-described components (e.g., the processor 102, the memory 104, the sensors 112, etc.) are depicted included in a hardware package 120. An example of the hardware package 120 includes but is not limited to a printed circuit board (PCB), such as a motherboard and/or a system-on-chip (SoC). In at least one variation, components of the system 100 are implemented using more than one hardware package, such using more than one printed circuit board (PCB). It is to be appreciated also, that in at least one variation, the system 100 does not include one or more of the depicted components and/or includes different components without departing from the spirit or scope of the described techniques.

In accordance with the described techniques, the processor 102 and the memory 104 are coupled to one another via a wired or wireless connection. The core 106 and the controller 108 are also depicted coupled to one another via one or more wired or wireless connections. The other components of the system 100 are connectable via wired and/or wireless connections. Example wired connections include, but are not limited to, memory channels, buses (e.g., a data bus), interconnects, through silicon vias, traces, and planes. Example wireless connections include, but are not limited to, a Wi-Fi connection, a Bluetooth connection, or a cellular network connection, among others. Other example connections include optical connections, fiber optic connections, and/or connections or links based on quantum entanglement.

Examples of devices or apparatuses in which the system 100 is implemented include, but are not limited to, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and other computing devices or systems.

The processor 102 is an electronic circuit that performs various operations on and/or using data in the memory 104. Examples of the processor 102 include, but are not limited to, a central processing unit (CPU), a graphics processing unit (GPU), a field programmable gate array (FPGA), an accelerator, an accelerated processing unit (APU), and a digital signal processor (DSP), to name a few. The core 106 is a processing unit that reads and executes instructions (e.g., of a program), examples of which include to add, to move data, and to branch. Although one core 106 is depicted in the illustrated example, in variations, the processor 102 includes more than one core 106, e.g., the processor 102 is a multi-core processor.

The memory 104 is a device or system that is used to store information, such as for immediate use in a device, e.g., by the processor 102 or by an in-memory processor (not shown), which is referred to as a processing-in-memory component or PIM component. In one or more implementations, the memory 104 corresponds to semiconductor memory where data is stored within memory cells on one or more integrated circuits. In at least one example, the memory 104 corresponds to or includes volatile memory, examples of which include random-access memory (RAM), dynamic random-access memory (DRAM), synchronous dynamic random-access memory (SDRAM), static random-access memory (SRAM), and memristors. In variations, the memory 104 corresponds to or includes graphics double data rate (GDDR) memory types (e.g., double data rate 6 (DDR6) and/or compression attached memory module (CAMM) form-factor memory).

The memory 104 is packaged or configured in any of a variety of different manners. Examples of such packaging or configuring include a dual in-line memory module (DIMM), a small outline DIMM (SO-DIMM), a registered DIMM (RDIMM), a non-volatile DIMM (NVDIMM), a ball grid array (BGA) memory permanently attached to (e.g., soldered to) the hardware package 120 (or other printed circuit board), and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 104 is configured as or includes a SO-DIMM or an RDIMM according to one of the above-mentioned standards, e.g., DDR, DDR2, DDR3, DDR4, and DDR5.

Alternatively, or in addition, the memory 104 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). The memory 104 is configurable in a variety of ways capable of supporting temporary adjustment of system settings, such as for temporarily adjusting the memory 104 between an overclocking mode and a non-overclocking mode.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 104 is configurable in a variety of ways without departing from the spirit or scope of the described techniques.

The controller 108 is a digital circuit that manages the flow of data to and from the memory 104. By way of example, the controller 108 includes logic to read and write to the memory 104 and interface with the core 106, and in variations to interface with multiple cores and/or a processing-in-memory component (not shown). For instance, the controller 108 receives instructions from the core 106 which involve accessing the memory 104, and the controller 108 provides data from the memory 104 to the core 106, e.g., for processing by the core 106. In one or more implementations, the controller 108 is communicatively and/or topologically located between the core 106 and the memory 104, and the controller 108 interfaces with both the core 106 and the memory 104. In one or more implementations, the controller 108 is separate from the processor 102. Alternatively, or additionally, the system 100 includes the controller 108 as part of the processor 102 and includes at least one additional controller separate from the processor 102, e.g., a memory controller.

The sensors 112 include motion sensors, imaging sensors, force sensors, or any other sensor that detects user position and movement. For example, the sensors 112 include infrared sensors, camera sensors, strain gauge sensors, lidar sensors, or the like. In variations, the sensors 112 are coupled via a wired or wireless connection to the processor 102, the memory 104, and/or the system management interface 110. The sensors 112 collect data and send the data to the processor 102. The processor 102 analyzes the data to determine whether the user is engaged in a high demand operation or a default demand operation, such as by detecting eye gaze information that indicates the user is engaged in or viewing an application that benefits from increased performance or power from components of the system 100, a body position of the user that indicates the user is not engaged in or viewing the application, or the like.

Additionally, or alternatively, the one or more sensors 112 include temperature sensors, or other sensors configured to collect information about an environment in which the system 100 operates, and/or one or more conditions of components of the system 100, such as one or more conditions of the memory 104, and/or one or more conditions of the processor 102. For example, the sensors 112 measure one or more operating conditions of the system 100, including temperature, radiation exposure, and/or vibration exposure, at the processor 102 and/or the memory 104. The system 100 compares the measured operating conditions to threshold values to determine whether the operating conditions of the processor 102 and/or memory 104 are within the threshold values. In variations, the threshold values are values that, if exceeded, incur instability or damage at the memory 104 and/or the processor 102 due to the temperature, radiation exposure, and/or vibration exposure. Alternatively, the threshold values are values that, if below, support boosted and/or increased performance of various components. For example, if a temperature of the environment in which components of the system operates is below a threshold, in one or more variations, this temperature supports running the components at a boosted level, such as a higher frequency or voltage, because the temperature of the environment cools the components.

The information collected about the environment in which the system 100 operates and/or manufacturing specifications of the system 100 define system capabilities of the system 100. For example, a system capability is a performance condition and/or power consumption supported by the system that does not cause the operating conditions (e.g., temperature, radiation exposure, and/or vibration exposure) of the system 100 to exceed the thresholds values and/or values specified by a manufacturer. The performance condition is an amount of useful work accomplished by the system 100 measured by, for instance, an accuracy, efficiency, and/or speed of execution of instructions by the components of the system 100 (e.g., the memory 104 and/or the processor 102). In some cases, the system capabilities depend on the environment of the system 100. For example, if the system 100 is in a relatively low temperature environment, a supported operating temperature (e.g., system capability) is relatively high. Similarly, if the system 100 is in a relatively high temperature environment, a supported operating temperature is relatively low.

In one or more implementations, the system 100 includes an architecture or framework for managing and accessing data across data sources, locations, and formats, which is referred to as a data fabric. In variations, the data fabric implements one or more hardware components and software components to unify different data storage environments. In some examples, the hardware components include a peripheral component interconnect express (PCIe), which is a high-speed serial computer expansion bus (e.g., data bus) for hardware connections, to facilitate high-speed data transfer within the system 100.

In one or more implementations, a system management interface 110 includes, or is otherwise configured to interface with, one or more systems capable of updating operation of various components of the system 100, examples of such systems include but are not limited to an adaptive volage scaling (AVS) system, an adaptive voltage frequency scaling (AVFS) system, and a dynamic voltage frequency system (DVFS). For example, the system management interface 110 uses such systems to adjust settings (e.g., power, voltage, frequency, timings, etc.) with which the various components of the system operate. In one or more implementations, the system management interface 110 is configured as a microcontroller disposed on a die running firmware to perform a variety of the operations discussed above and below. Alternatively or in addition, the system management interface 110 is or includes circuitry applied to or otherwise fabricated on (e.g., printed, etched, and/or deposited on) one or more hardware components of the system, such as the hardware package(s) 120, the processor 102, and the memory 104. The circuitry is arranged and also applied using logic that enables the system management interface 110 to carry out the functionalities described above and below.

The memory 104, the processor 102, and hardware components implemented by a data fabric, operate according to respective clock rates. For example, the clock rate of a processor 102 (e.g., a CPU) refers to a frequency at which an internal clock circuitry of the processor 102 generates electrical pulses. A higher clock rate means the processor 102 performs additional operations per unit of time, which, in some cases, improves performance of the processor 102.

The clock rate for the memory 104, or memory clock speed, represents the speed at which memory modules (e.g., RAM) transfer data to and from the processor 102. That is, the memory clock speed indicates a rate at which data is read to and from the memory 104. Higher memory clock speeds result in relatively fast data access, which improves performance of the system 100. In some cases, the memory 104 is trained during a boot up process to operate according to multiple different overclocking memory profiles, such as a high-bandwidth overclocking memory profile (e.g., for a productivity application), and a low latency overclocking memory profile (e.g., for gaming). By "pre-training" multiple different memory profiles, the need of conventional systems to "retrain" the memory profiles during a reboot to switch between memory profiles is eliminated. As such, the memory 104 dynamically switches between the different memory profiles in real time without rebooting the system 100, which reduces boot failures caused by training the memory 104 while also improving the end user experience associated with memory overclocking.

The clock rate for additional hardware components, such as an input/output (I/O) clock rate, represents the frequency at which data is transferred between the processor 102, the memory 104, and various I/O devices (e.g., storage drives, network interfaces, display devices, the PCIe, and peripheral devices).

In some examples, the components of the system 100 (e.g., the processor 102, the memory 104, and any additional hardware components) are designed with a defined power consumption condition, operating frequency, and timing (e.g., clock rate), and/or operating voltage, which are referred to as default operating settings. The default operating settings account for performance of the components, operational limits of the components (e.g., temperature), power consumption of the components, among other factors. For example, the default operating settings maintain a level of performance of the components that does not exceed the operational limits of the components, while minimizing the power consumption to extend battery life.

However, some users execute applications or programs that increase the demand (e.g., performance condition, power condition, etc.) for the components past an average, or default, demand, such as a gaming program, a financial trading program that monitors current market conditions, or the like. In some examples, the default settings do not provide sufficient performance or power of the components for relatively high-demand operations, such as for applications 114 with relatively high data transfer into and out of the memory 104, a relatively high rate of I/O data, and/or a relatively increased quantity of commands executed by the processor 102 (e.g., due to increased changes in graphics, increased rate of incoming data traffic, etc.). The reduced performance or power due to insufficient operating settings (e.g., power, clock rate, and/or voltage) for the components of the system 100 negatively impacts user experience by causing delays and other performance degradation of the system 100.

In some examples, to reduce, or eliminate, the performance degradation, a user adjusts operational settings of the system 100 (e.g., a clock rate of the system 100) manually, such that the system 100 operates at a power, clock frequency, timing, or a voltage that is relatively high compared with the default operating settings. The relatively high power, clock frequency, timing, and/or voltage are referred to as overclocking settings, and the system 100 is overclocked when the overclocking settings are used. However, in some implementations, the user is unable to reset the system 100 to the default operating settings. Overclocking the system 100 when the relatively high performance that overclocking provides is not being utilized results in inefficient power usage for the system 100 due to an increase in power consumption by the components operating at a higher power, clock frequency, timing, and/or voltage. Additionally, or alternatively, overclocking the system 100 for extended durations causes instability or damage to the components of the system 100 due to operating outside of an operational limit (e.g., overheating, additional wear on the components, etc.).

In accordance with the described techniques, the system management interface 110 is configured to temporarily adjust the settings of the components of the system 100, such that the components operate using overclocking mode settings 116 and/or using non-overclocking mode settings 118 for defined durations. In one or more implementations, the overclocking mode settings 116 include multiple different overclocking modes with respective parameter values that the system management interface 110 selects from, including varying levels of overclocking based on performance, power consumption, or the like. The parameter values include one or more of an operating power, an operating voltage, an operating frequency, or a timing. In variations, the operating voltage results in the change to the operating power. The operating frequency and timing define a clock rate of the system 100. Similarly, the non-overclocking mode settings 118 include multiple different non-overclocking modes with respective parameter values that the system management interface 110 selects from, including a default mode, a low power mode, a low performance mode, or the like. The overclocking mode settings 116 and/or the non-overclocking mode settings 118 are configured to specify a variety of settings for operating the processor 102, the memory 104, or any other component of the system 100 in one or more implementations, such as various clock, voltage, and power settings.

In some examples, the components of the system 100 include an integrated graphics processing unit (iGPU) and/or dedicated external graphics (dGPU; via PCIe connection). The GPUs are overclocked in a similar fashion to the CPU or run in efficiency modes. Similarly, in variations, the PCIe interconnect is overclocked beyond the PCIe specification or run at a lower link speed (e.g., frequency) or link width. Additionally, or alternatively, the link speed is reduced to a PCIe standard link speed (e.g., 2.5 megatransfers (MT) per second). In some examples, internal busses are overclocked, such as the data fabric and/or a graphical management interface (GMI). In one or more implementations, internal logic blocks are overclocked including a link clock frequency (LCLK) (e.g., I/O clock, interlink between I/O devices such as PCIe, controller, or universal serial bus (USB), among other features, to the rest of the SOC).

Example settings for the memory 104 include, but are not limited to, a data rate (e.g., megatransfers per second), a number of cycles between sending a column address to memory and the beginning of data in a response, a minimum number of clock cycles to open a row and access a column, a measure of latency between issuing a precharge command to idle or close open row and an activate command to open a different row, a minimum number of clock cycles between a row active command and issuing a precharge command, nominal power supply voltage, output stage drain power voltage, and programming power voltage. Example settings for the processor 102 include, but are not limited to, clock speed frequencies based on workload and temperature, a maximum operating power, an operating voltage, and a voltage frequency curve, among others. A workload is based on threads, processes, and data flows for implementing applications 114 and/or an operating system. It is to be appreciated that one or more of the overclocking mode settings 116 and/or the non-overclocking mode settings 118 specify values for one or more of those settings and/or various other settings associated with operating components of the system 100 without departing from the spirit or scope of the described techniques.

In some cases, the system management interface 110 receives a signal (e.g., from a processor 102) that triggers the temporary adjustment of the settings. The processor 102 transmits the signal via a wired or wireless connection between the system management interface 110 and the processor 102. In variations, the processor 102 determines to transmit the signal based on information collected by the sensors 112, information input by a user of the system 100, system data including a current or anticipated performance demand of the system 100 (e.g., based on historical system demand trends), system data including a current or anticipated power demand of the system, capabilities of the system 100, and/or application data from one or more applications 114 executed by the system 100. For example, the system management interface 110 detects (e.g., receives or otherwise determines) application data that indicates a current state of the application 114, where the current state also indicates a current or anticipated performance condition and/or power consumption by the application 114.

Figure 2:
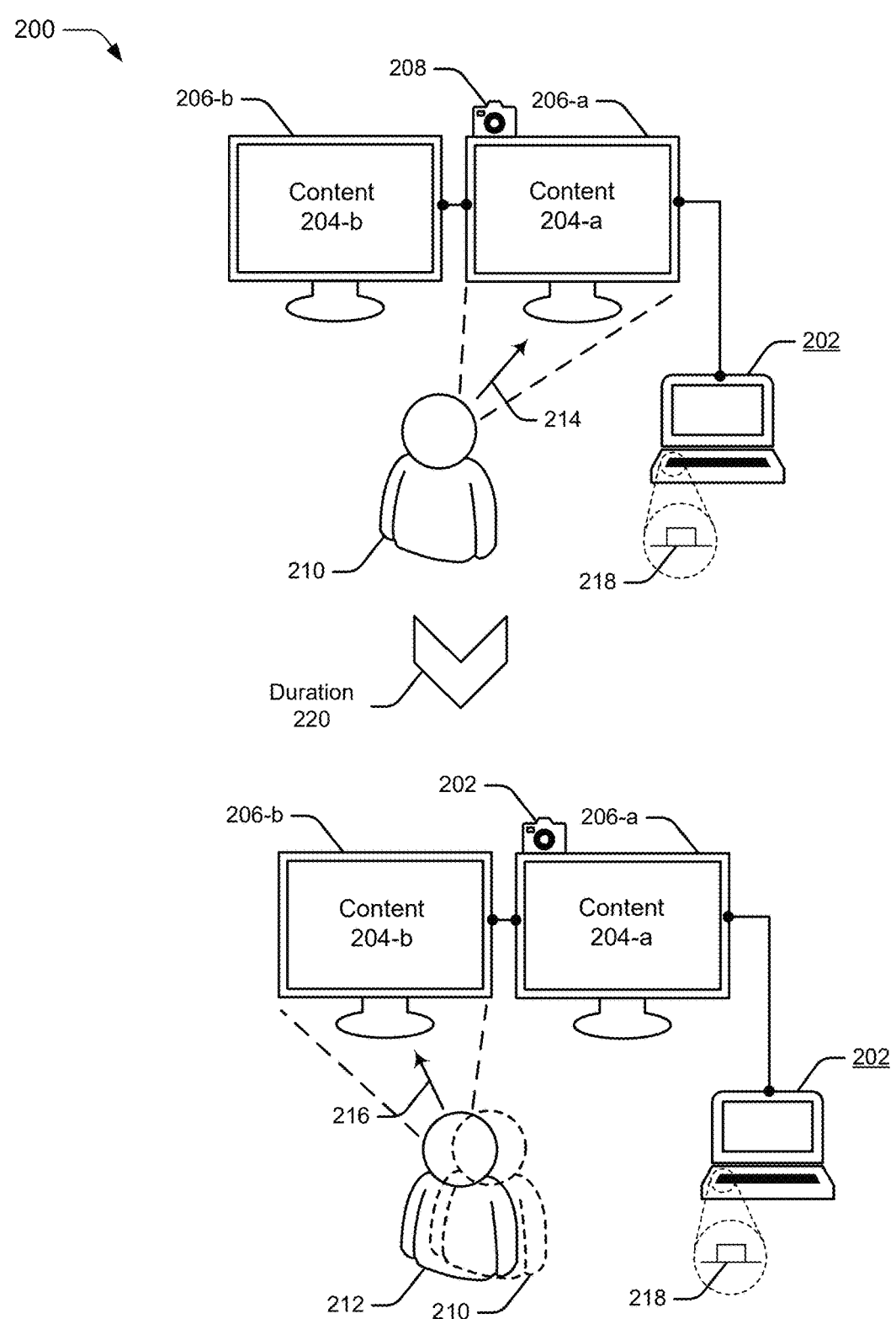
FIG. 2 depicts a non-limiting example in which a signal causes a temporary adjustment to system settings.

In one or more implementations, the processor 102 receives data from the sensors 112 and analyzes the data to determine a current and/or anticipated performance condition of one or more components of the system 100, which is described in further detail with respect to FIG. 2. For example, the processor 102 receives images of the user, analyzes the images to determine an eye gaze of the user is directed towards a portion of a user interface that is displaying an application 114 with a relatively high power or performance demand (e.g., a gaming application that has a relatively high turnover of displayed graphics and an increased I/O input), and sends a signal to the system management interface 110 to transition the processor 102, the memory 104, and/or additional hardware components, to overclocking mode settings 116 to account for the high power or performance demand of the application 114. In some other examples, the processor 102 determines an eye gaze of the user is directed towards a portion of a user interface that is displaying an application 114 with a relatively low power or performance demand (e.g., a productivity software applications), and sends a signal to the system management interface 110 to transition the processor 102, the memory 104, and/or additional hardware components, to non-overclocking mode settings 118 to reduce power consumption of the system 100 while the user views the application 114.

The system management interface 110 is configured to adjust operation of one or more components of the system 100 dynamically, such as by communicating a signal to adjust a frequency, voltage, and/or timings at which components of the system operate. The system management interface 110 is configured to temporarily adjust the operation of the components of the system 100, such that the components return to one of the overclocking mode settings 116 or the non-overclocking mode settings 118 after a duration or based on a change in status of the user (e.g., an eye gaze of a user moves from a relatively low demand application to a relatively high demand application, and then back to a relatively low demand application). In variations, the duration is a timer that is initialized upon transition from a non-overclocking mode to an overclocking mode, where the timer is preconfigured or otherwise defined. In other variations, the duration is determined by changes in operation of components of the system 100, such as due to a change in performance or power demand of the components of the system 100, which is monitored by the system management interface 110.

Although the system management interface 110 is depicted separately from the processor 102 and the memory 104, in one or more implementations, the system management interface 110 is included as part of the processor 102, the memory 104, or the additional hardware component(s). Alternatively, or additionally, one or more components of the system 100 includes a component manager (not shown), which performs one or more of the operations described above and below as being performed by the system management interface 110. By way of example, and not limitation, the processor 102 and the memory 104 each include a component manager, operable to implement temporary settings adjustment for components of the system 100. Although a firmware implementation is discussed above, in one or more variations, the system management interface 110 is implemented using hardware in addition to or rather than firmware. In one example, for instance, the system management interface 110 is implemented using hardware in a core.

In at least one variation, the system management interface 110 exposes one or more interfaces (e.g., an application programming interface (API) and/or a user interface 122) configured to receive input 124 specifying adjustments to the settings. In some other variations, the system management interface 110 receives input 124 specifying adjustments to the settings via a hardware component of the system 100 that interfaces with the processor 102 (e.g., via one or more buttons). For example, the input includes end user direct button-based inputs, user eye gaze information, user engagement information, current activity information from internal performance counters by an instruction pointer (IP), current system capabilities, output of data from hardware inference engines, or the like. The system management interface 110 adjusts the settings of one or more components of the system 100 according to the input 124. Examples of adjustments include, but are not limited to, processor overclocking states and features, memory and data fabric changes including actuation of memory profiles, changes to clock rate for I/O including PCIe and other clocks and voltages, among others. The adjustments configure the components to operate at a relatively high power or performance state, to revert to operating at a default power or performance state or to operating at a relatively low power or performance state, where the relatively low power or performance state is lower than the default power or performance state.

In one or more implementations, the system management interface 110 outputs feedback to a user indicating the settings of the components of the system 100. In at least one variation, the feedback includes feedback detectable by one or more senses of a user, including visual feedback, haptic feedback, audio feedback, among other types of feedback. In some variations, the visual feedback is provided to the user through on case, on chip lights (e.g., light emitting diodes (LEDs)), or other lights. For example, a processor 102 or other component of the system 100 has lights configured to be visible to a user of the system 100, where an intensity of the lights, a pattern of the lights, a color of the lights, or the like indicates the settings of the components of the system 100. In some other variations, the feedback includes haptic feedback, such as vibration or other tactile feedback via a game controller or other system component that a user interacts with. In some other variations, the feedback includes audio feedback provided to the user via one or more audio output components, such as speakers, of the system 100.

As noted above, in variations, the component settings are adjustable based on user input (e.g., the input 124), sensor data, system data, and/or application data. By way of example, the illustrated example depicts user interface 122. In one or more variations, the user interface 122 is output by an application 114, such as a productivity application, a gaming application, a finance application, or any other application. The user interface 122 is depicted receiving input 124, where the processor 102 uses the input 124 to adjust one or more settings of the components of the system 100. For instance, the user interface 122 outputs a list of settings for display to the user, and the user selects settings for one or more components of the system 100 from the list. The system management interface 110 temporarily adjusts the settings using the user selection and/or additional information inferred from the system 100. In some other examples, the user interface 122 outputs content of an application 114 for display to a user, and the system 100 uses one or more hardware components (e.g., the sensors 112) to detect engagement of the user in the application 114, application data related to the performance and power consumption of the application 114, or both to temporarily adjust the settings of one or more components of the system 100.

Although not depicted in the illustrated example, in one or more variations, the system management interface 110 or some other component of the system 100 stores or otherwise maintains one or more profiles for adjusting the settings of the components of the system 100. By way of example, each profile corresponds to one or more workloads and defined respective parameters to which to adjust the settings when those one or more workloads are executed or otherwise performed by the system 100. Thus, when the one or more workloads are detected, the system management interface 110 adjusts the settings of the components of the system 100 automatically (e.g., without user input) to have the respective parameters specified in the profile. It is to be appreciated, however, that in variations, profiles of overclocking settings are specified for operating conditions other than for workloads, such as for detected system temperature (or ranges of temperatures), optimizations (e.g., thermal or power reduction, high bandwidth, or low latency), and/or applications. In one or more implementations, such profiles are created based on user input, based on system data, based on application data from the application 114, based on sensor data from the sensors 112, or received from another source.

Notably, performance settings for component overclocking that are determined using a combination of application data, system data, sensor data, or user input are more accurate than conventional techniques, which throttle operation based on a manual override of default settings by a user. More accurate determination of system and/or component performance is particularly advantageous for overclocking, as overclocking impacts the integrity and battery life of the components in the system 100 if performed for too long or with excessive clock rates, voltages, or both.

In the context of temporary adjustment to system settings of the system 100, consider the following discussion of FIG. 2.

FIG. 2 depicts a non-limiting example 200 in which a signal causes a temporary adjustment to system settings. The non-limiting example 200 includes, or is implemented by, the processor 102, the memory 104, and the system management interface 110 from FIG. 1.

In one or more implementations, a user interacts with a device 202 by viewing, providing input, and/or receiving output from the device 202. The device 202 displays content 204-*a* and/or content 204-*b* via a display component 206-*a* and/or a display component 206-*b*, respectively, such as screens, monitors, or other display hardware. The device 202 is wired or wirelessly connected to the display component 206-*a* and/or the display component 206-*b*. Although two display components (e.g., the display component 206-*a* and the display component 206-*b*) are shown, the device 202 is capable of communicating with any numerical quantity of display components. Similarly, each display component is capable of displaying different content (e.g., content 204-*a* and content 204-*b* via the display component 206-*a* and the display component 206-*b*, respectively).

In some examples, a display component 206-*a* displays content 204-*a*, which is different than content 204-*b* displayed by a display component 206-*b*. For example, the content 204-*a* includes display of a first application, and the content 204-*b* includes display of a second application. In variations, the first application is a relatively high power or high-performance demand application, while the second application is a relatively low power or low performance demand application. In other variations, the first application is a relatively low power or low performance demand application, while the second application is a relatively high power or high-performance demand application. A relatively high power or high-performance demand application causes a higher workload for one or more components of a hardware system, such as for a processor 102, a memory 104, and/or one or more hardware components implemented by a data fabric, as described with respect to FIG. 1. A relatively low power or low-performance demand application causes a default or lower workload (e.g., lower than default or lower than the high workload) for the one or more components of the hardware system.

In one or more implementations, the device 202 is coupled with one or more sensors 208, which include examples of sensors 112 as described with reference to FIG. 1. For example, the device 202 is wired or wirelessly connected to one or more sensors 208, including motion sensors, camera sensors, or any other sensors. The sensors 208 collect information (e.g., measurements or data) that is sent to a processor of the device 202. The device 202 analyzes the information from the sensors 208 to detect or determine one or more of changes in position of a user, changes in engagement of a user, or changes in eye gaze of a user, among others. For example, the device 202 receives motion data and/or image data from the sensors 208 and analyzes the motion data and/or image data to determine the user is in a position 210.

In variations, analyzing the sensor data includes implementing data processing techniques to detect user position information, eye gaze information, and/or user engagement information, such as by using machine learning models trained on historical sensor data. Additionally, or alternatively, the analyzing includes comparing the data collected by the sensors 208 across time intervals to detect changes in one or more of user position, eye gaze, or user engagement, among others. If the sensors 208 collect camera images, the analyzing includes one or more camera image processing techniques. In one or more implementations, the camera image processing techniques include, but are not limited to, image enhancement via noise reduction, image filtering, image segmentation, image compression, feature detecting and matching, face detection and recognition, image restoration, and image segmentation, among others.

In one or more examples, the sensors 208 detect that a user moves from a position 210 to a position 212 by detecting movement of a body part (e.g., turning a position of a head of the user) from a direction 214 to a direction 216. Additionally, or alternatively, the sensors 208 detect that an eye gaze of a user changes from a direction 214 to a direction 216. In some examples, the motion and/or change in eye gaze, accompanied by system data (e.g., application data related to user interaction with the content 204-*a* and/or the content 204-*b*), indicates an engagement level of the user.

In some cases, the device 202 includes a user input interface 218 that provides for a user to manually adjust one or more system settings. For example, the device includes one or more buttons that correspond to the system settings, a user interface that provides for the user to select the system settings, or any other hardware or software that provides for user input.

In some examples, the content 204-*a* and/or the content 204-*b* includes an application or program that increases a performance demand, a power demand, or both for the components past an average, or default, demand, such as a gaming program, a financial trading program that monitors current market conditions, or the like. In some examples, default settings do not provide sufficient performance or power of the components for relatively high power demand or performance demand operations, such as for content with relatively high data transfer into and out of memory, a relatively high rate of I/O data, and/or a relatively increased quantity of commands executed by a processor (e.g., due to increased changes in graphics, increased rate of incoming data traffic, etc.). The reduced performance due to insufficient clock rate and/or voltage for components of the device 202 (e.g., memory, processor, and/or other hardware components) negatively impacts user experience by causing delays and other performance degradation of the device 202.

In some examples, to reduce, or eliminate, the performance degradation, a user adjusts the clock rate of the device 202 manually, such as using the user input interface 218. For example, the user selects settings with a clock frequency or a voltage that is relatively high compared with the default settings. The relatively high clock frequency and/or voltage are referred to as overclocking settings, and the device 202 is overclocked when the overclocking settings are used. However, in some implementations, the user is unable to reset the device 202 to the default settings. Overclocking the device 202 when the relatively high performance that overclocking provides is not being utilized results in inefficient power usage for the device 202 due to an increase in power consumption by the components operating at a higher clock rate and/or voltage. Additionally, or alternatively, overclocking the device 202 for extended durations causes instability or damage to the components of the device 202 due to operating outside of an operational limit (e.g., overheating, additional wear on the components, etc.).

Further, updating settings of the components of the device 202 to operate in an overclocking mode or a non-overclocking mode currently involves a full stack software solution in addition to the detailed manual inputs from the user in an operating system. The manual inputs are received via a push of a button or a turn of a knob, which provides a simple change to the system rather than complex multi-factor comprehensive system changes. Additionally, a button or a knob does not provide visual, haptic, or other feedback of the system change to the user.

As described herein, a system temporarily adjusts system settings for one or more components of the device 202 (e.g., memory components, processor components, or other hardware components) upon receiving a signal triggering the adjustment. The signal is transmitted upon analyzing information, such as a manual user input indicating to adjust the settings, system information related to current and anticipated power or performance demand of the system, application data indicating to adjust the settings, positioning data, and/or motion data of the user.

In variations, the user provides the manual input via the user input interface 218. In one or more implementations, the user input interface 218 explicitly detects a system settings adjustment and/or duration for the adjustment, such as by displaying options (e.g., including adjustable parameters) to the user for an overclocking mode and/or a non-overclocking mode for specific durations, components, or both. In one or more other implementations, the user input interface 218 uses algorithms to detect a system settings adjustment from a user input that does not explicitly indicate the settings adjustment. For example, if a user engages in a gaming application, then the user input includes inputs from a game controller (e.g., the game controller is the user input interface 218). The system detects a current and/or expected performance demand, power demand, or both from the input from the game controller (e.g., if the user changes a rate of pressing buttons on the controller, an initial use of the controller to indicate that the user is starting a game, or any other information from the game controller), and the system implicitly adjusts the settings using the user input. Similarly, the system detects performance demand, power demand, or both from keyboard strokes, mouse clicks, touch screen interaction, and/or any other type of user input.

In one or more implementations, a user provides the manual input via a controller button push, such as for a gaming application. The button push indicates the user wants a burst of maximized performance during a portion of a gaming match, such as to maximize frames per second (FPS) and minimize latency for response. Additionally, or alternatively, an eye gaze of a user and/or other output of an inference engine (e.g., an artificial intelligence (AI) inference engine) indicates an anticipated performance desire of a user. For example, internal metrics that a game is being played accompanied by the user being intensely focused on a monitor displaying the game indicates the user is engaged in a gaming application, which has a higher power demand and performance demand than some other applications. In variations, the system utilizes one or more manual user inputs (e.g., one or multiple buttons corresponding to different modes for gaming, stock trading, rendering, etc.) in combination with sensor output indicating user positioning and/or eye gaze and application detection or inference engine output to boost the system performance. For example, the system adjusts settings of components of the device 202 to boost system performance for a high frequency application, such as a trading application, to execute algorithms for trading with a reduced system latency. The adjustment to the settings includes transitioning to an aggressive overclocking mode during critical market inflection points (e.g., market open or close, a federal reserve announcement, etc.) or on demand as requested through user input.

In variations, a processor receives application data related to the content 204-a and/or the content 204-b running on the device 202. For example, the application data includes the information or content that is created, processed, or stored within various software applications or systems. The application data indicates a current and/or expected power consumption of the applications running on the device 202, a current and/or expected numerical quantity of commands executed by the processor for the applications running on the device 202, or any other application data related to a performance and/or power of any components of the device 202. The system utilizes the application data to select settings for one or more parameters, and to select a duration for which to adjust the settings. For example, if there is a change in application data that indicates a performance and/or power demand increase or decrease, then the system adjusts settings of the components of the device 202 from a non-overclocking mode to an overclocking mode for an increase or from an overclocking mode to a non-overclocking mode for a decrease.

In variations, a processor receives positioning information of a user, motion data of a user, or both from sensors 208. For example, the positioning information indicates the user is in the position 210 for viewing the content 204-a, indicates an eye gaze of the user is in the direction 214, which is towards the content 204-a, or the like. The motion data detects how long a user is in a position 210, or a change in position, such as from the position 210 to the position 212. In one or more implementations, a length of a duration for which the user is in a position 210 indicates an engagement of the user in the content 204-a. For example, if the user is in a position 210 where the user is directed towards the content 204-a, the system determines the user is engaged in the content 204-a. If the user is in a position 212 where user is not directed towards the content 204-a, the system determines the user is not engaged in the content 204-a.

The system utilizes the data collected by the sensor 208 to select parameter values for settings of individual components, and to select a duration for which to adjust the settings for the components. For example, if the user is engaged in the content 204-*a*, then the system updates settings of one or more components from a non-overclocking mode to an overclocking mode to support performance and/or power conditions of the content 204-*a*. If the user is not engaged in the content 204-*b* (e.g., if the user is not viewing the content, if the body position of the user indicates the user is asleep, or the like), the system updates the settings of the components from an overclocking mode to a non-overclocking mode. In some examples, updating the settings of the components includes adjusting control registers (e.g., model specific registers (MSRs)) to enable and disable one or more features, adjusting operating parameters to disable, enable, and/or otherwise change the behavior of prefetchers, updating various internal parameters for memory caches (e.g., four levels of caches), loosen or tighten timing parameters within the SOC or multi-chip processor such as the I/O link between the memory controller and the memory, among other updates.

Similarly, if the user changes from a position 210 to a position 212 after a duration 220, the system determines the user is no longer viewing the content 204-*a* and is instead viewing the content 204-*b*. In variations, the content 204-*a* has different power and/or performance conditions than the content 204-*b*. The system determines to update system settings for one or more components for the duration 220 based on the performance or power conditions of the content 204-*a* and/or the content 204-*b*. For example, the user is engaged in a gaming application in the position 210 and is engaged in a productivity software application in the position 212. The gaming application has increased performance and power demand relative to the productivity software application. The system updates the component settings from an overclocking mode for the gaming application in the position 210 to a non-overclocking mode in the position 212 after the duration 220. Similarly, if the content 204-*b* has a high performance and/or power demand relative to the content 204-*a*, then the system updates the component settings from a non-overclocking mode in the position 210 to an overclocking mode in the position 212.

In variations, the user switches between the position 210 and the position 212, or another position, multiple times. For example, the user views content 204-*a* for a duration 220, then views the content 204-*b* for another duration before switching back to viewing the content 204-*a*. In one or more implementations, the user views content 204-*a* for a duration 220, then views the content 204-*b* for another duration prior to falling asleep or otherwise ending an engagement in the content 204-*b*. The system updates the settings from a non-overclocking mode to an overclocking mode, and then back to a non-overclocking mode after a duration, or vice-versa, as the engagement of the user changes between content with different power or performance demands or if the engagement in the content ends. Each time there is a change in engagement in content (e.g., determined by a change in motion data, camera image processing data, or any other analysis from sensor data), the system updates the parameters of the settings for respective components. Additionally, or alternatively, each time there is an anticipated change in power or performance demand (e.g., determined from application data, system information, or user input), the system updates the parameters of the settings for respective components. Thus, the adjustment of settings from the overclocking mode to the non-overclocking mode or from the non-overclocking mode to the overclocking mode is temporary, or applicable for a defined duration.

In one or more implementations, a system uses algorithmic detection of system conditions to determine parameters to adjust for component settings and/or duration of an adjustment of parameters for component settings. For example, the system inputs one or more of the manual user input information, the application data, sensor data, component capabilities, or current system measurements or conditions to an algorithm that outputs the settings adjustment and/or the duration. In variations, the algorithm is a machine learning model trained on historical data (e.g., historical system demand trends). In variations, a historical system demand trend is an average or pattern of power demand, processing demand, and/or any other demand on the system for a set past duration.

For example, a user of the system historically logs-on to the system every day for at least seven days at a time (e.g., 8:00 am) and accesses an application 114 that uses a relatively high numerical quantity of processing resources, resulting in a relatively high performance condition or demand and a relatively high operating power. In this example, the set past duration is seven days. The machine learning model identifies the trend of the user logging on to the system at the time and automatically (e.g., without user input or intervention) adjusts the system 100 to an over-clocking mode to account for the relatively high use of processing resources and relatively high operating power at that time or just before that time. If the user accesses the application 114 that uses the relatively high performance condition and high operating power for a duration (e.g., two hours), and then switches to an application 114 that uses a relatively low performance condition and relatively low operating power, the machine learning model identifies the trend of the user switching between the applications 114 and automatically adjusts the system 100 back to a default mode or to a non-overclocking mode other than the default mode. In one or more implementations, the system implements the system changes based on data collected through integrated camera image processing by a processor, connection of sideband system management unit (SMU) signals via physical buttons, on chip inference engines that monitor current system conditions and activities, and the like.

In some examples, the system performs face detection of a specific user (e.g., for multi-user systems) using camera image processing techniques, and combines the face detection information with inference engine data on that user related to historical data indicating common usage scenarios of the device 202. The system instantiates settings of one or more components of the device 202 in an overclocking mode or a non-overclocking mode to maximize end user experience for content 204-*a* and/or content 204-*b* (e.g., applications) using historical trends for user interaction with the content 204-*a* and/or the content 204-*b*. The system stores historical data indicating the trends for the user interaction and/or the settings for each user in a database for access (e.g., a cloud-based database or other type of database). In variations, the system updates the stored settings based on manual input from a user, a change in usage pattern of the device 202 for a user, or any other factor that causes an update to the settings for components of the device 202 for a user.

Thus, the settings of different components of the device 202 are dynamically adjusted based on multiple factors with comprehensive user input (e.g., both physical and non-physical user input) and system behavior monitoring. The adjustment is presented to the user via direct feedback, such as by visual feedback presented to the user, haptic feedback, or the like. For example, the system includes a numerical quantity of LEDs that are illuminated according to a color or a pattern that indicates that the settings are adjusted for different components. In some other examples, the system includes a controller or other hardware component in contact with skin of a user that vibrates according to a pattern, for a duration, or the like to indicate the settings are adjusted for different components. Adjusting the settings of different components for durations (e.g., temporarily) depending on performance and/or power conditions of the system ensures efficient power usage and improved user experience, due to the change into and out of the overclocking mode. In some examples, the settings are adjusted independent of an operating system (e.g., in an operating system agnostic fashion).

Having discussed example systems and non-limiting examples of temporary system adjustment for component overclocking, consider the following example procedures.

FIG. 3 depicts a procedure in an example 300 implementation of temporary system adjustment for component overclocking.

At 302, a signal is received that triggers a temporary adjustment of operation of the at least one memory and the at least one processor from operation according to first settings to operation according to second settings without rebooting. The first settings and/or the second settings configure the at least one memory or the at least one processor to operate in an overclocking mode. In one or more implementations, the at least one memory and the at least one processor are operated according to the second settings for a duration, or a period of time.

In some examples, the signal is based on receiving user input that triggers the temporary adjustment of operation of the at least one memory and the at least one processor according to the second settings. A processor receives the user input and sends the signal to the system management interface if the user input indicates the adjustment of operation of the at least one memory and the at least one processor. In some other examples, information about a user interacting with an application that utilizes at least one of the memory or the processor is collected by one or more sensors. The sensors include motion sensors and/or camera imaging sensors. In variations, the information includes eye gaze information related to a direction of an eye gaze of a user, position information of a user, engagement information of a user, or the like. A processor sends the signal based on analyzing the information to detect parameters and/or a duration for the adjustment of operation of the at least one processor and the at least one memory.

In one or more implementations, the sensors include temperature sensors, radiation sensors, vibration sensors, and/or other sensors that collect information about an environment in which the system operates, one or more conditions of the memory, and/or one or more conditions of the processor. The processor receives system information about at least one of a performance condition of the system or a power consumption utilized by at least one of the at least one memory or the at least one processor (e.g., application data, system capabilities, historical system demand trends, environmental information, etc.) and sends the signal based on analyzing the system information to detect parameters and/or a duration for the adjustment of operation of the at least one processor and the at least one memory.

In variations, the first settings configure the at least one memory and/or the at least one processor to operate in a non-overclocking mode, and the second settings configure the at least one memory and/or the at least one processor to operate in an overclocking mode. In other variations, first settings configure the at least one memory and/or the at least one processor to operate in an overclocking mode, and the second settings configure the at least one memory and/or the at least one processor to operate in a non-overclocking mode. The first settings and/or the second settings include or are used to set one or more of an operating power, an operating voltage, an operating frequency, or a timing. The timing and the operating frequency define a clock rate. In variations, the operating voltage is directly proportional to the operating power.

At 304, operation of the at least one memory and the at least one processor according to the first settings is resumed after a period of time associated with the temporary adjustment of operation (e.g., of the at least one memory and the at least one processor).

In some examples, a timer is initiated based on receiving the signal. The operation of the at least one memory and the at least one processor according to the first settings is resumed upon expiry of the timer. The period of time is the duration of the timer. In some other examples, one or more changes in operation of the at least one memory and the at least one processor are monitored. The operation of the at least one memory and the at least one processor according to the first settings is resumed upon detecting the one or more changes. In one or more implementations, information related to an eye gaze, position, or engagement of a user is monitored. The operation of the at least one memory and the at least one processor according to the first settings is resumed upon detecting a change in the information.

FIG. 4 depicts a procedure in an example 400 implementation of temporary system adjustment for component overclocking.

At 402, at least one memory and at least one processor are operated according to first settings.

At 404, a signal is received that triggers a temporary adjustment of operation of the at least one memory and the at least one processor according to second settings without rebooting. The first settings and/or the second settings configure the at least one memory or the at least one processor to operate in an overclocking mode. By way of example, at 406, the first settings are used to configure the at least one memory and/or the at least one processor to operate in a non-overclocking mode, and the second settings are used to configure the at least one memory and/or the at least one processor to operate in an overclocking mode. In some other examples, at 408, the first settings are used to configure the at least one memory and/or the at least one processor to operate in an overclocking mode, and the second settings are used to configure the at least one memory and/or the at least one processor to operate in a non-overclocking mode. The first settings and/or the second settings include or are used to set one or more of an operating power, an operating voltage, an operating frequency, or a timing. The timing and the operating frequency define a clock rate. In variations, the operating voltage is directly proportional to the operating power.

At 410, operation of the at least one memory and the at least one processor according to the first settings is resumed after a period of time associated with the temporary adjustment of operation (e.g., of the at least one memory and the at least one processor).

At 412, feedback is output via a user interface indicating the temporary adjustment of operation of the at least one memory and the at least one processor according to the second settings. In variations, the feedback includes sensory feedback. The sensory feedback includes visual feedback, such as LEDs with a color, pattern, numerical quantity, or the like that indicate different adjustments of component settings. Additionally or alternatively, the feedback includes haptic feedback, such as vibration of a hardware component of the system or any other sensory feedback.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processor 102, the memory 104, and the system management interface 110) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
at least one memory; and
at least one processor configured to:
receive a signal that triggers a temporary adjustment of operation of the at least one memory and the at least one processor from operation according to first settings to operation according to second settings without rebooting, the temporary adjustment of operation updating one or more of an operating power, an operating voltage, an operating frequency, or a timing of the at least one memory and the at least one processor; and
resume operation of the at least one memory and the at least one processor according to the first settings, after a period of time.

2. The system of claim 1, wherein at least one of the first settings or the second settings configure the at least one memory or the at least one processor to operate in an overclocking mode.

3. The system of claim 1, wherein the signal that triggers the temporary adjustment of operation is based on input.

4. The system of claim 1, further comprising one or more sensors configured to collect information with an application that utilizes at least one of the at least one memory or the at least one processor.

5. The system of claim 1, wherein the at least one processor is further configured to receive system information about at least one of a performance condition of the system or a power consumption of at least one of the at least one memory or the at least one processor.

6. The system of claim 1, wherein the at least one processor is further configured to cause output via a user interface of feedback indicating the temporary adjustment of operation of the at least one memory and the at least one processor according to the second settings.

7. The system of claim 1, wherein the at least one processor is further configured to initiate a timer based on receiving the signal, wherein the operation of the at least one memory and the at least one processor according to the first settings is resumed upon expiry of the timer.

8. The system of claim 1, wherein the at least one processor is further configured to monitor for one or more changes in operation of the at least one memory and the at least one processor, wherein the operation of the at least one memory and the at least one processor according to the first settings is resumed upon detecting the one or more changes.

9. The system of claim 1, wherein the first settings and the second settings are used to set one or more of an operating power, an operating voltage, an operating frequency, or a timing.

10. The system of claim 4, wherein the one or more sensors comprise at least one of motion sensors or camera imaging sensors.

11. The system of claim 4, wherein the information comprises at least one of eye gaze information, positioning information, or engagement information.

12. The system of claim 4, wherein the at least one processor is further configured to monitor the information, wherein the operation of the at least one memory and the at least one processor according to the first settings is resumed upon detecting a change in the information.

13. The system of claim 1, further comprising one or more sensors configured to collect information about at least one of an environment in which the system operates, one or more conditions of the at least one memory, or one or more conditions of the at least one processor.

14. The system of claim 5, wherein the system information comprises at least one of application data, system capabilities, or historical system demand trends.

15. A method comprising:
receiving a signal that triggers a temporary adjustment of operation of at least one memory and at least one processor from operation according to first settings to operation according to second settings without rebooting, the temporary adjustment of operation updating one or more of an operating power, an operating voltage, an operating frequency, or a timing of the at least one memory and the at least one processor; and
resuming operation of the at least one memory and the at least one processor according to the first settings, after a period of time.

16. The method of claim 15, wherein at least one of the first settings or the second settings configure the at least one memory or the at least one processor to operate in an overclocking mode.

17. The method of claim 15, wherein the signal that triggers the temporary adjustment of operation is based on input.

18. The method of claim 15, further comprising collecting, via one or more sensors, information with an application that utilizes at least one of the at least one memory or the at least one processor.

19. The method of claim 15, further comprising receiving system information about at least one of a performance condition or a power consumption of at least one of the at least one memory or the at least one processor.

20. A device comprising:

at least one memory;

at least one processor configured to:

operate the at least one memory and the at least one processor according to first settings;

receive a signal that triggers a temporary adjustment of operation of the at least one memory and the at least one processor from operation according to the first settings to operation according to second settings without rebooting, the temporary adjustment of operation updating one or more of an operating power, an operating voltage, an operating frequency, or a timing of the at least one memory and the at least one processor; and resume operation of the at least one memory and the at least one processor according to the first settings, after a period of time; and at least one user interface configured to output feedback indicating the temporary adjustment.

* * * * *